United States Patent Office 3,345,313
Patented Oct. 3, 1967

3,345,313
ALKYD RESINS AND THEIR PREPARATION FROM REACTION MIXTURES COMPRISING A POLYMETHYLOLALKANOIC ACID
Robert J. Ruhf and Edward J. Russell, Allentown, and Walter S. Egge, Bethlehem, Pa., assignors to Trojan Powder Company, Allentown, Pa., a corporation of New York
No Drawing. Filed Feb. 20, 1963, Ser. No. 260,031
28 Claims. (Cl. 260—22)

The present invention relates to novel alkyd resins and to their preparations; and more particularly the invention relates to water-soluble alkyd resins, especially useful in making baking finishes or air-drying finishes, and to novel methods of making the same.

Alkyd, or polyol-polybasic acid, resin compositions have been used extensively in the preparation of protective coatings. Coatings comprising alkyd resins are noted for their resistance to weather exposure, toughness, flexibility, adhesion and good working properties. However, a serious shortcoming of alkyd resins presently available is that they are essentially insoluble in water. Hence, they are usually dissolved in organic solvents, such as petroleum distillates or coal tar distillates, or, alternatively, these resinous compositions are dispersed in water to form two-phase systems, i.e., emulsions and dispersions. The poor water solubility of these materials limits their usefulness in certain areas. Moreover, the added cost due to the organic solvent required is a significant factor when considering applications of these resins on a commercial scale.

It is the principal object of the present invention to provide novel alkyd resins.

A further principal object is to provide water-soluble alkyd resins.

Another object of the present invention is to provide improved water-soluble alkyd resins especially useful in surface coatings.

Still another object is to provide improved water-soluble alkyd resins especially useful in baking or air drying surface finishes.

Other objects, including the provision of novel methods of making the stated alkyd resins, will become apparent from a consideration of the following specification and the claims.

The present invention comprises, in the preparation of an alkyd resin by heating a reaction mixture comprising a polyhydric alcohol and a polycarboxylic acid, the improvement comprising including in said reaction mixture a polymethylolalkanoic acid selected from the group consisting of trimethylolacetic acid and dimethylolalkanoic acids having from five to seven carbon atoms, that is, the formula

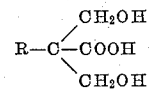

where R is an alkyl group containing from 1 to 3 carbon atoms. The resulting condensation polymer will have an acid number as hereinafter set forth, the major portion of which is provided by the free carboxyl groups supplied by the polymethylolalkanoic acid. The polymer, by virtue of the free carboxyl groups, can be neutralized with a water-solubilizing base to provide a water-soluble resin capable of forming true solutions in water.

The polymethylolalkanoic acid may, as stated, be trimethylolacetic acid. Preferably, however, it is a dimethylolalkanoic acid having the above-mentioned formula, such as dimethylolpropionic acid, dimethylolbutyric acid and dimethylolvaleric acid. The presently preferred dimethylolalkanoic acid is dimethylolpropionic acid. It is not necessary that the pure polymethylolalkanoic acid be employed since it has been found that the unrefined reaction product, containing the polymethylolalkanoic acid, obtained by the oxidation of the corresponding dimethylolalkanal can be used as the source of the polymethylolalkanoic acid with the production of somewhat darker resins than when the pure or refined material is used.

Trimethylolacetic acid may be prepared according to the procedures described in German Patent 1,035,639 of Jan. 15, 1959 and in Z. Physiol. Chem., vol. 303, pages 230–233, 1956. The dimethylolalkanoic acids may be prepared according to procedures described in Monatsh., vol. 22, pages 443–459, 1901; Monatsh., vol. 42, pages 227–244, 1921 (C.A., 16, No. 6, page 904); Monatsh., vol. 88, pages 1099–1104, 1957 (C.A., 52, No. 14, page 11779g), and Chem. Ber., vol. 95, pages 102–107, 1962 (C.A., 56, No. 11, page 12732d).

As is the case in conventional alkyd resin manufacture, a polyhydric alcohol and a polycarboxylic acid are principal reactant components of the alkyd resin of the present invention. With respect to the polyhydric alcohol, as is well known this will contain at least two hydroxyl groups, with those most readily available commercially generally containing no more than six. The polyhydric alcohols used in alkyd resin manufacture also contain from two to fifteen carbon atoms. The polyhydric alcohols which may be employed in practicing the invention are glycerol; straight-chain glycols, like ethylene glycol, trimethylene glycol, tetramethylene glycol, pentamethylene glycol, octamethylene glycol and similar, well known polymethylene glycols; branched-chain glycols, such as neopentyl glycol, 2-methyl-pentanediol and 3-methylhexanediol; propanediol; the pentaerythritols, like mono-, di- and tripentaerythritols; trimethylolalkanes, like trimethylolethane, trimethylolpropane and trimethylolbutane; 1,2,6-hexane triol, tetramethanol, cyclohexanol; the hexols, like sorbitol; and the like. Combinations of two or more different polyhydric alcohols may be used. Technical as well as pure grades of polyhydric alcohols may be used. In this connection, the trimethylolalkane products of application Ser. No. 786,454 filed Jan. 30, 1959, now U.S. Patent No. 3,097,245 issued July 9, 1963, are particularly useful.

The polycarboxylic acid, as is well known in alkyd resin manufacture, will contain two or three, preferably two, carboxyl groups, and may be aromatic or aliphatic, either straight chain or branched chain. Examples of polycarboxylic acids which can be used include citric, tartaric, citraconic, malonic, glutaric, phthalic, isophthalic, terephthalic, oxalic, succinic, adipic, azelaic, suberic, camphonic, mellitic and sebacic acids. Since the corresponding anhydrides are equivalent to the stated acids, it will be understood that reference herein and in the claims to the polycarboxylic acids will include use of the corresponding anhydrides. The polycarboxylic acids generally contain from two to twelve carbon atoms, with the preferred acids containing from four to eight carbon atoms. Combinations of two or more polycarboxylic acids may be used. For example, it may be desirable to combine a straight chain polycarboxylic acid, like adipic acid, with an aromatic polycarboxylic acid, like phthalic, the former to enhance flexibility.

In preparing the resins of the present invention, the molar ratio of the polyhydric alcohol to polycarboxylic acid will range from about 2:3 to about 3:2. Selection of specific proportions of polyhydric alcohol and polycarboxylic acid will present no problem to those familiar with alkyd resin chemistry. As is also well known in this regard, excess polyhydric alcohol or polycarboxylic acid can be employed as a "chain stopper" to control the length of the polymer chain and hence the molecular weight of the resin. Yet excesses of either over the stoichiometric amount tend to downgrade films made from the resin.

As in conventional alkyd resin manufacture the polyhydric alcohol and polycarboxylic acid combine through esterification between the hydroxyl groups of the former and the carboxyl groups of the latter with the liberation of water. However, in accordance with the present invention, the polymethylolalknoic acid also enters into the reaction becoming part of the polymer chain, through esterification between its hydroxyl groups and the carboxylic groups of the polycarboxylic acid. The carboxyl group of the polymethylolalkanoic acid is sluggish and therefore slow to react under the stated esterification conditions. Thus, there will remain in the resin prepared according to the present invention unreacted carboxyl groups provided by the polymethylolalkanoic acid. These unreacted carboxyl groups, it has been found, upon neutralization with a solubilizing base, discussed in detail hereafter, impart the water solubility characteristic of the novel resins of this invention. Hence, the measure of the relative amount of polymethylolalkanoic acid employed is the acidity of the resulting resin. For the desired water-solubility upon neutralization, it has been found that the resins should have an acid number between about 35 and about 75, with the preferred resins having acid numbers between about 45 and about 60. When a polycarboxylic acid containing three carboxyl groups is used as some or all of the polycarboxylic acid component, one of the carboxyl groups will remain as such, unreacted, in the resin and will necessarily contribute to the acidity of the resin. Nevertheless, in the present resins at least half of the acidity (as measured by acid number) will be provided by the polymethylolalkanoic acid. In accordance with preferred practice of the invention, wherein little or no tricarboxylic acid is employed, substantially all of the acidity of the resin will be provided by the polymethylolalkanoic acid. Expressed in other terms, the amount of polymethylolalkanoic acid will generally range between about 0.1 and about 1, preferably between about 0.3 and about 0.5 mols thereof per mol of polycarboxylic acid. On the basis of the resin (the reaction product of alcohol and all acid components including polymethylolalkanoic acid) the polymethylolalkanoic acid constitutes between about 3 and about 38%, preferably between about 10 and about 32%, by weight, based on the weight of the resin solids.

The alkyd resins of this invention can be prepared in accordance with the usual processes for making alkyd resins, including either batch or continuous techniques. The reactants, including the polymethylolalkanoic acid, can be introduced to the reaction zone in any suitable manner, preferably simultaneously. The reaction is effected conveniently under atmospheric pressure conditions and at elevated temperature as by heating the reaction mixture to a temperature above 150 and up to about 250° C. The reaction time will, of course, depend upon the temperature, and may be as little as 1–2 hours at the higher temperature in the stated range and as long as 15–30 hours at lower temperatures in the range. In any event, the reaction is carried on until complete as determined by reduction of the acid number to the desired figure without the aforementioned range. The reaction is preferably conducted under an atmosphere of inert gas, such as carbon dioxide or nitrogen, and means are generally provided for the removal of water as it is formed. Once melting of the reactants has occurred, the reaction mixture may be agitated (stirred). A small amount (2–4%, by weight, of the weight of the reactants) of a solvent, such as a coal tar distillate like xylene, may be included primarily to assist in the removal of water formed during the reaction.

The resulting resin contains carboxyl groups and can, by virtue of these groups, be substantially neutralized with a water-solubilizing base to form a water-soluble resin. Initially, however, the product of the above-discussed reaction is normally cooled. Its solids content may then be reduced to between about 20 and above 50%, preferably between about 30 and about 40%, by weight. This can be done by adding water or water containing an additive, such as the solubilizing base. The water-solubilizing base may be any one of those whose cation forms water-soluble compounds with organic acid, i.e., fatty acids, such as ammonium hydroxide; lower aliphatic amines, which may be primary, secondary or tertiary, like ethanolamine, methylamine, diethanolamine, dimethylamine, dimethylethanolamine, trimethylamine and triethylamine; the alkali metal hydroxides, like sodium hydroxide, potassium hydroxide and lithium hydroxide; and the like. A particularly suitable general purpose neutralizing base is ammonium hydroxide. When added as a 3%, by weight, solution in water, preferably preheated to 70–80° C. the solution can also serve to reduce the solids content of the resin. For specific uses for the resins, discussed more in detail hereafter, certain of the amines, notably dimethylethanolamine and triethylamine, are preferred. The solubilizing base will substantially neutralize the resin, that is raise its pH to above about 6.5 and preferably between about 7 and about 8.5.

In one embodiment of the invention, the resin is particularly useful as a baking finish, that is a coating which is then heated after application. A typical resin, capable of being neutralized for use as a water-soluble baking fiinsh, prepared from four mols of neopentyl glycol, three mols of phthalic anhydride, three mols of trimethylolpropionic acid and one mol of adipic acid can be represented by the following proposed idealized theoretical structure:

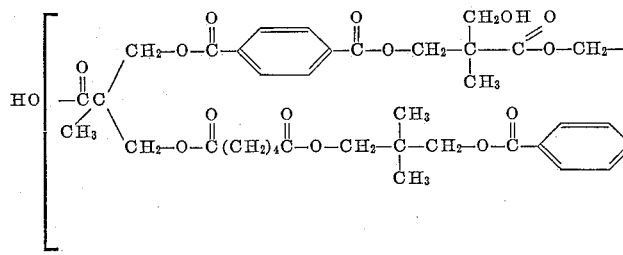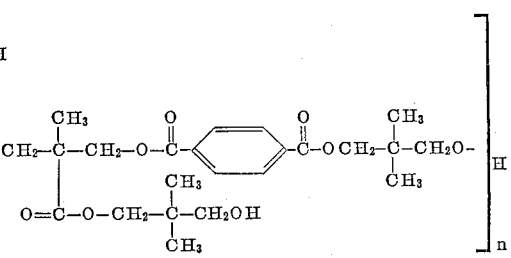

wherein $n$ is a small whole number from 1 to 4.

According to the above proposed structure, irrespective of the chain length of the resin, there will be a free hydroxyl group at one end of the chain, i.e. the free hydroxyl group in the terminal neopentyl glycol. There would also be a free carboxylic acid group present, i.e. in the terminal dimethylolpropionic acid, which can be neutralized by ammonia and the like to render the resin water soluble. In addition, there will usually be at least three other free hydroxyl groups present in the chain which are found to aid in solubilizing the resin.

In these baking finish alkyd resins, particularly preferred resins are those prepared from polyhydric alcohol, polymethylolalkanoic acid and polycarboxylic acid in molar proportions of 4:3:4, 3.5:3.5:4 and 5:3:5.

In preparing these baking resins the reactants are generally heated to a temperature above 150° C. but no greater than 230° C., with temperatures between about 180 and about 200° C. being preferred. In this preferred temperature range the reaction is complete in about 4–6 hours.

As is known with alkyd resin baking finishes, cratering of the resin coating can be avoided during baking by including in the resin composition a small amount of a surfactant, such as a polyoxyethylene adduct of sorbitol, or of a cross-linking agent, such as a water-soluble urea-formaldehyde condensation product, a water-soluble melamine-formaldehyde condensation product like hexa-(methoxymethyl) melamine; or the like. Addition of a crosslinking agent also facilitates curing of the resin on baking, permitting a lower temperature to be used. The surfactant will generally be added in an amount between about 0.5 and about 5%, by weight, based on the weight of the resin solids, whereas the crosslinking agent may be added in as much as 25–30%, by weight, based on the weight of the resin solids.

These water soluble alkyd resins can be used in water based coating compositions which can be baked to give smooth, tough films having good adhesion to the surface upon which they are formed. These coating compositions have several outstanding advantages over coatings available heretofore including dispersed coatings such as latex-based coatings.

The water base alkyd resin compositions of the invention are not flammable which is a commercially attractive feature, particularly in the automotive industry in the application of undercoatings where the entire automobile body or parts may be dipped and baked without evolution of volatile combustibles and the attendant fire hazard. A further advantage of the present alkyd resins is that costly organic solvents and thinners are not required in the baking finishes resulting in substantial reduction in the cost of coating compositions containing these resins. Additionally, the clean-up of equipment used in applying and processing these coating compositions is facilitated since only water is required for that purpose. It has been found that the water-based alkyd resin coatings of the invention can be pigmented by up to 100% by weight more than water-thinned coating compositions previously available. This increase in pigment concentration is particularly useful where one-coat application compositions are desired. The coating compositions of the invention are also found to have improved adhesion, particularly to previously painted and chalky surfaces.

In another embodiment of the invention water-soluble alkyd resins are prepared which can form insoluble films when exposed to air at room temperature and without baking, although the resins will cure upon heating. In the case of these air-drying resins, an unsaturated fatty acid is included with the reactants. The unsaturated fatty acids are of the drying type of liquid fatty acids, and provide the air drying properties of the alkyd resins. Unsaturated monocarboxylic acids and mixtures of such acids, such as those derived from glyceride oils, including linoleic acid, linolenic acid, other linseed oil fatty acids, dehydrated castor oil fatty acids, tall oil fatty acids, soya oil fatty acids and sunflower seed oil fatty acids, may be used. Particularly preferred are linseed oil fatty acids, tall oil fatty acids, dehydrated castor oil fatty acids and soya oil fatty acids. Such unsaturated fatty acids generally contain from about 12 to about 20, preferably between 18 and 20, carbon atoms. As is known, commercial unsaturated fatty acids in the preferred carbon atom range usually also contain small amounts of $C_{12}$, $C_{14}$ and $C_{16}$ unsaturated fatty acids. Since the preparation of the resin involves esterification of one mol of the unsaturated fatty acid with one mol of the polyhydric alcohol, the corresponding monoester of the unsaturated fatty acid and the polyhydric alcohol is the equivalent of the separate use of the individual reactants, and it will be understood that reference herein and in the claims to the use of an unsaturated fatty acid and of a polyhydric alcohol will include use of the corresponding monoester.

The amount of unsaturated fatty acid employed depends upon the nature of the polyhydric alcohol, which, in the case of these air drying resins will contain at least three hydroxyl groups. Thus a polyhydric alcohol having three hydroxyl groups will have one such group available for reaction with the unsaturated fatty acid, a polyhydric alcohol containing four hydroxyl groups will have two hydroxyl groups available for reaction with the unsaturated fatty acid, and so on. Thus it may be said that, the amount of unsaturated fatty acid, in mols, will be substantially equivalent to the quantity $(x-2)$ times the number of mols of polyhydric alcohol, where $x$ is the number of hydroxyl groups in the polyhydric alcohol.

Since the air drying resins rely on unsaturation, as in the unsaturated fatty acid residue, for its air-drying properties, a small amount of an unsaturated polycarboxylic acid may be included. The unsaturated polycarboxylic acids will, except for the unsaturation, otherwise correspond to the saturated polycarboxylic acids discussed hereinabove. Examples of unsaturated polycarboxylic acids are maleic acid, fumaric acid, itaconic acid, and the like.

The water-soluble air drying resins of this embodiment of the invention are thus condensations reaction products of the polyhydric alcohol (containing at least three hydroxyl groups) the polycarboxylic acid, the polymethylolalkanoic acid and the unsaturated fatty acid. A typical such resin, capable of being neutralized for use as a water-soluble air drying finish, prepared from two mols of trimethylolethane, three mols of phthalic anhydride, one mol of dimethylolpropionic acid and two mols of unsaturated fatty acid can be represented by the following proposed idealized theoretical structure:

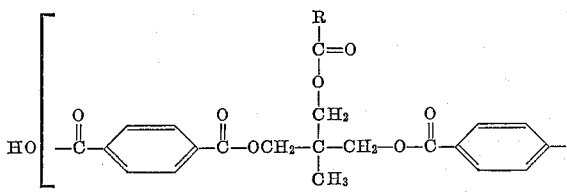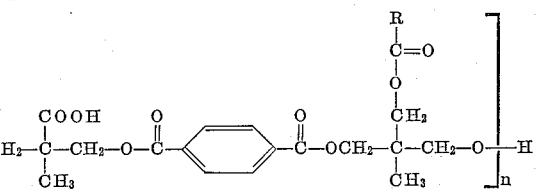

where R is an unsaturated aliphatic group provided by the unsaturated fatty acid and $n$ is a whole number from 3 to 9, preferably from 4 to 6.

As shown above, there are free carboxyl groups, internal as well as terminal, which can be neutrailzed with the water-solubilizing base to form a water-soluble resin. The free hydroxyl group, or groups, present may also contribute to water solubility.

In preparing these air drying resins the reactants are generally heated to above 150° C. but not over about 250° C., more often between about 180 and about 235° C. In a preferred procedure, the temperature is initially raised to between about 190 and about 200° C. in about one hour, and then raised to between about 215 and about 235° C. until the acid number drops to the desired figure within the range herein above set forth.

Following completion of the reaction, the resin is cooled, its solids content reduced and neutralized as described above. In the case of these air drying resins, however, it is desired to incorporate a minor proportion of a coupling solvent in the solution to aid in the evaporation of the water and thus to insure a smooth film on drying. A coupling solvent, as is known, is an organic liquid which is soluble in water and forms a constant evaporating mixture therewith, and is also a solvent for the resin, like tertiary butyl alcohol.

Thus, in reducing the solids content of the air drying resin such a coupling solvent may be included in the water. One part by weight of tertiary butyl alcohol to 4–5 parts of water is particularly suitable for thinning the resin.

Dryers containing cobalt, manganese and lead, such as manganese, cobalt and lead naphthenates, can be added to the alkyd resinous compositions in conventional proportions, either in water or in conventional oil-base media, as is the usual practice with conventional drying oil-base surface coating materials. Suitable drying results are obtained by incorporating from about .001 to about 2% manganese, cobalt or lead naphthenates or mixtures thereof, based on total resin solids.

These neutralized air drying alkyd resins are water soluble, and form insoluble films when exposed to air or oxygen-containing gases. Films and coatings produced from these alkyd resins can be washed and cleaned with water without redissolving. The alkyd resins of this aspect of the invention are stable on storage, and coatings prepared from these alkyd resins will maintain their stability during cycles of freezing and thawing. Since these resins are water soluble the essential carrier or vehicle can be water, and only minor amounts of organic thinners and solvents may be used if desired. Coating compositions prepared from these water soluble, alkyd resins are essentially odor-free.

A particularly attractive feature of these air drying resinous compositions is that they can be used to prepare high gloss enamel coating compositions which have excellent covering power and which will adhere to previously painted surfaces, even when the surfaces have become chalky as a result of exposure to the elements. Moreover, by varying the pigmentation in the coating compositions containing these alkyd resins, various effects may be obtained including high gloss, semi-gloss, egg shell, high sheen, flat or dead flat.

A further advantage of the water soluble, air drying alkyd resins of the invention is that they can be used to prepare coatings with very flexible formulation characteristics. That is, these resins can be prepared in various oil lengths (proportion of fatty acid or oil) and therefore, in various degrees of flexibility, hardness, drying time, and the like. These variations in oil length are generally referred to as long, medium and short oil alkyds.

In a third embodiment of the invention, a water-soluble baking type alkyd resin is prepared following the procedure used in making the air-drying resin but employing a saturated fatty acid in place of the unsaturated fatty acid. In this case, the incorporation of a crosslinking agent of the type discussed hereinabove is required. Suitable saturated fatty acids that may be employed in this embodiment of the invention are those saturated monocarboxylic acids containing from six to about 20 carbon atoms. Especially suitable saturated fatty acids in this regard are caproic acid, caprylic acid, the coconut oil fatty acids (principally lauric acid), the castor oil fatty acids (principally $C_{18}$) and the fatty acids derived from other non-drying oils like olive oil, beef tallow, mutton tallow, and the like.

The following examples illustrate the preparation of alkyd resins according to the present invention, are used for illustrative purposes only and are not intended to limit the scope of the invention in any way.

*Example I*

Three mols of solid crystalline dimethylolpropionic acid having a melting point of 178–180° C. are combined with five mols of neopentyl glycol and three mols of phthalic anhydride and charged into a three-necked round bottom flask equipped with a heating mantle, stirrer, thermometer, $CO_2$ inlet and an electrically heated standpipe. Sufficient $CO_2$ is introduced initially to blanket the reaction mixture. A small amount of $CO_2$ is introduced continuously at a slow rate during the reaction. The standpipe exhaust temperature is maintained at 110–120° C. by means of an electric heating tape. Upon melting, the reaction mixture is stirred and stirring is continued during the reaction.

When the reaction mixture reaches 170–180° C. two mols of adipic acid are added. Heating is continued and the acid number drops to 50–60. The reaction product is then cooled to 100° C. and reduced to 30%, by weight, solids by the addition of a sufficient amount of a 3%, by weight, $NH_4OH$ solution, providing a pH of 7–8. Hexa-(methoxymethyl) melamine is added to the reaction product in an amount to provide twenty parts by weight of the melamine to eighty parts by weight of the resin (solid basis).

A series of six mil films are drawn on glass and tin panels and baked for 30 minutes at 150° C. to produce smooth glossy films which are hard and flexible and have a pleasing appearance. The films on the tin panels passed the ⅛″ mandrel test (i.e. the tin panels could be bent around a ⅛″ mandrel without showing rupturing of the film). The films on the glass have a Sward Hardness value of 58 after aging from 6–24 hours.

*Example II*

Example I is repeated except that three mols of dimethylolpropionic acid in an unrefined state (actual amount used is based on the acid number of 135–136 for the pure material) is used in place of dimethylolpropionic acid, and the molar ratio of neopentyl glycol:dimethylolpropionic acid:phthalic anhydride:adipic acid is 4:3:3:1. The alkyd resin obtained provides films having characteristics substantially similar to those produced according to Example I with the exception that they are slightly yellow in color.

*Example III*

Four mols of neopentyl glycol, three mols of dimethylolpropionic acid, and three mols of phthalic anhydride are charged into a three-necked round bottomed flask equipped with a heating mantle, stirrer, thermometer, $CO_2$ inlet and an electrically heated standpipe. Sufficient $CO_2$ is introduced to maintain a blanket thereof over the reactants during the reaction. The standpipe exhaust temperature is maintained at 110–120° C. by means of an electric heating tape. Stirring is initiated when the charge begins to melt. At 170–180° C. one mol of adipic acid is added. Heating is continued with the temperature being held at 190° C. until the acid number drops to 50–60.

The reaction product is cooled to 100° C. and reduced to 30%, by weight, solids by adding an appropriate amount of water containing 3% ammonium hydroxide preheated to 70–80° C. A final resinous product (I) is adjusted to a pH of 7–8 by the addition of small amounts of concentrated ammonium hydroxide. A second resin (II) is similarly prepared as resin (I) with, however, the molar proportion of neopentyl glycol:dimethylolpropionic acid:phthalic anhydride:adipic acid being 3.5:3.5:3.0:1.0. To each of these resins, 5%, by weight, of the polyoxyethylene adduct of sorbitol is added to eliminate cratering.

These resins are evaluated according to color, clarity and viscosity. The results are tabulated in Table I below.

TABLE I

| Property | Resin | |
|---|---|---|
| | I | II |
| Viscosity (Gardner-Holdt) | $Z_1$ | I–J |
| Cook Time (hrs.) at— | | |
| 170° C | 16 | |
| 190° C | 6 | 5.5 |
| Color | (1) | (2) |
| Clarity | (3) | (3) |

¹ Very slightly yellow.
² Slightly yellow.
³ Slightly opalescent.

Films 10 mils thick of resins I and II are drawn down on glass and tin panels and baked 2 hours at 200° C. to give tough cohesive coatings which possess respective Sward Hardness values of 78 and 88. Both films on the tin panels pass the 1/8" mandrel test.

The above resins I and II, when treated with triethylamine and dimethylethanolamine in place of ammonium hydroxide solubilizing agent, show very similar characteristics. Also, coatings made with resins prepared using molar ratios of neopentyl glycol:dimethylolpropionic acid:phthalic anhydride:adipic acid of 5:3:3:1, 5:3:3:2 and 2:1:1:1 are found to yield excellent results. Satisfactory resins are also prepared by substituting propylene glycol for neopentyl glycol on a molar basis, although the Sward Hardness values of such resins average about 46 (after aging from 6–24 hours). However, the propylene glycol-containing films show slightly superior alkali resistance.

*Example IV*

A 5:3:3:2 resin (III) is prepared using the reactants and procedure described in Example III above. Resin III is divided into three portions (a, b and c) which are neutralized and reduced to 30%, by weight, solids by the use of aqueous solutions providing:

(a) 8%, by weight, dimethylethanolamine, based on weight of resin,
(b) 10%, by weight, triethylamine, based on weight of resin and
(c) 3%, by weight, NH$_4$OH, based on weight of resin Each of these resins is modified with 20%, by weight, of hexa(methoxymethyl)melamine, and 6 mil films are drawn on glass and on tin and baked ½ hr. at 150° C. to give smooth glossy films. These films are tested and give the results set forth in Table II below.

TABLE II

| Resin | Sward Hardness* | 1/8" Mandrel Test | Film Rating |
| --- | --- | --- | --- |
| III (a) | 54 | Pass | Very good. |
| III (b) | 56 | do | Do. |
| III (c) | 58 | do | Do. |

*Aging period is from 6 to 24 hours.

*Example V*

An alkyd resin is prepared using the procedure and molar ratios of Example II using, however, unrefined dimethylolbutanoic acid in place of the unrefined dimethylol-propionic acid. Otherwise, the resin is substantially identical with that of Example II. Films prepared from the resin, which is neutralized with dimethylethanolamine and contains 20%, by weight, of hexa(methoxymethyl)melamine based on the weight of the resin, are baked 30 minutes at 150° C. to give films having the characteristics shown in Table III below.

*Example VI*

A composition is prepared according to Example II except that unrefined dimethylolvaleric acid is used in place of the unrefined dimethylolpropionic acid. The films prepared from this water soluble resin have the characteristic shown in Table III below.

TABLE III

| Characteristic | Dimethylolbutanoic Acid Resin | Dimethylolvaleric Acid Resin |
| --- | --- | --- |
| Sward Hardness [1] | 58 | 64. |
| 1/8" mandrel | Pass | Pass. |
| Resistance to 2% NaOH for 70 hours [2] | Excellent | Excellent. |

[1] Aging period is from 6 to 24 hours.
[2] Test discontinued at 70 hours.

*Example VII*

An air-drying alkyd resin is prepared from 3 mols of phthalic anhydride, 2.2 mols of technical trimethylolethane, 2 mols of linseed oil fatty acids and 1 mol of crystalline dimethylolpropionic acid. The reactants are fed simultaneously to a reaction vessel equipped with a heating mantle, a stirrer, a thermometer, a $CO_2$ inlet and a reflux condenser fitted with a standard water trap. Two to four percent of xylene is included to aid in removal of water. The reaction mixture is heated, under an atmosphere of $CO_2$, to 221° C. in about one hour and held at this temperature with stirring until the acid number drops to 56–58. After cooling to 60° C., the resin is reduced to a solids content of 35%, by weight, using a mixture of 80 parts of water and 20 parts of tertiary butyl alcohol. The resin is adjusted to a pH of 7.5 with triethylamine.

The resin solution is found to have the following characteristics:

Viscosity (Gardner-Holdt) _____ Z–1
Color (Gardner) _____ 2–3
Appearance _____ (1)

[1] Translucent—slightly turbid.

Conventional water-soluble dryers are added to give a metal content of 0.9%, by weight, lead and 0.04% by weight manganese. Films of the product are drawn on tin and glass plates. These films show the following characteristics: they are set to touch within four hours, dry tack-free in 7.5 hours, and dry and hard within 18 hours. The films have a smooth, glossy finish, have an acceptable toughness and flexibility and pass the 1/8" mandrel test. After 24 hours the films have a Sward Hardness of 20, and after one week a Sward Hardness of 30.

This example is repeated using, however, potassium hydroxide to neutralize the resin. Films of the resulting resin have the same general characteristics as the above resin, having a Sward Hardness of 34 after five days, but are somewhat darker in color.

Following the procedure of Example VII but eliminating the dimethylolpropionic acid and employing an additional mol of trimethylolethane results in an alkyd resin that cannot be rendered water soluble.

*Example VIII*

An alkyd resin is prepared from 3 mols of phthalic anhydride, 1.2 mols of technical trimethylolethane, 1.2 mols of monopentaerythritol, 1.5 mols of linseed oil fatty acids, 1.5 mols of tall oil fatty acids and 1 mol of dimethylolpropionic acid according to the procedure of Example VII except that the resin is reduced to a total solids content of 40% by weight with a thinner comprising 5 parts by weight of distilled water and one part by weight of tertiary butyl alcohol. The resultant mixture has the following characteristics:

Viscosity (Gardner-Holdt) _____ Z–2
Color (Gardner) _____ 3+
Appearance _____ (1)

[1] Turbid—translucent.

Air dried films are prepared from this mixture containing 0.1% by weight lead and 0.04% by weight manganese and display the following properties: they are dry to touch within 6 hours and are dry and tack-free within 18 hours; and they pass the 1/8" mandrel test, and have a Sward Hardness of 22 after 96 hours.

*Example IX*

In this example an alkyd resin is prepared using a soya bean monoglyceride which is prepared as follows: 390 g. of soya bean oil are heated to 150° C. in a standard alkyd cook apparatus, 110 g. of technical trimethylolethane are added and the temperature is raised to about 200° C. Litharge (0.11 g.) is added as a catalyst and the temperature is raised to 232° C. and held there for 45 minutes to effect alcoholysis, producing the corresponding monoglyceride having the following characteristics:

Viscosity (Gardner-Holdt) _____ Q
Color (Gardner) _____ 5

This monoglyceride is then used in the preparation of an alkyd resin as follows: 3 mols of phthalic anhydride, 1.05 mols of dimethylolpropionic acid and 2 mols of the soya oil monoglyceride are reacted according to the solvent cook process described above in which the mixture is heated for 30 minutes at 204° C., then raised to 224–227° C. and held there until an acid number of between about 53 and 54 is obtained. The viscosity (Gardner-Holdt) of the alkyd resin is Z-6+ and it has a color (Gardner) of 5.

The mixture is neutralized with 8.3% by weight based on the total resin solids, of dimethylethanolamine and reduced to a solids content of about 30% by weight with a thinner consisting of 5 parts of distilled water and 1 part of tertiary butyl alcohol. The resultant mixture shows good solubility and is translucent. To the neutralized mixture are added conventional water soluble dryers providing 0.1% by weight of lead and 0.04% by weight of manganese, and films of varying thickness are prepared from the resulting product. The properties of these films are set forth in Table IV below.

TABLE IV

| Thickness of Film in Inches | Dry to Touch in Hours | Dry and Tack-Free in Hours |
| --- | --- | --- |
| 0.002 | 1 | 6 |
| 0.003 | 1⅓ | 15 |
| 0.004 | 1⅔ | 18 |

All the above films are glossy, display excellent adhesion and pass the ⅛" mandrel test, and the 0.003" film had a Sward Hardness value of 14 after 96 hours.

*Example X*

An alkyd resin is prepared according to the procedure of Example VII using 3 mols of phthalic anhydride, 2.2 mols of dipentaerythritol, 4 mols of linseed oil fatty acids and 1 mol of dimethylolpropionic acid. The cook is held for one hour at 204° C. and then at 221° C. until the acid number falls to between about 55 and 58. The viscosity (Gardner-Holdt) of the resultant resin is Z-6+, and the color (Gardner) is 5–6. The reaction mixture is neutralized with dimethylolamine and thinned with a mixture of 5 parts of water and 1 part of tertiary butanol to a solids content of about 40% by weight. Conventional water-soluble dryers are added to give 0.1%, by weight, lead, 0.02%, by weight, manganese and 0.02%, by weight, cobalt. Films having thickness of 0.003 inch are dry in 6 hours at room temperature. These films are substantially free of pinholes and have a Sward Hardness of 26 after 96 hours.

*Example XI*

Example VII is repeated with the exception that unrefined dimethylolpropionic acid, unrefined dimethylolbutanoic acid and unrefined dimethylolvaleric acid, respectively are used in place of the crystalline dimethylolpropionic acid. As compared to the resins of Example VII, the resins of this example displayed slightly deeper color, the viscosity (Gardner-Holdt) is about $X-Y$ and the color (Gardner) is about 8. Films of the resins of this example possess the following properties:

| | Set to Touch (hrs.) | Dry, Tack Free (hrs.) | Dry and Hard (hrs.) | Sward Hardness (96 hrs.) |
| --- | --- | --- | --- | --- |
| Dimethylolpropionic Acid | 4 | 8 | 96 | 12 |
| Dimethylolbutanoic Acid | 5 | 8 | 96 | 12 |
| Dimethylolvaleric Acid | 5 | 8 | 96 | 14 |

*Example XII*

Three mols of phthalic anhydride, 3 mols of linseed oil fatty acids, 2 mols of technical trimethylolethane and 1 mol of trimethylolacetic acid are charged into a reaction vessel equipped with an azeotropic leg with water condenser, thermometer, stirrer, and $CO_2$ inlet. A small amount of xylene is added. The trimethylolacetic acid used is in the form of an unrefined product 38% of which was trimethylolacetic acid. The mixture is heated to 220° C., under an atmosphere of $CO_2$, until the acid value is 55–60. The xylene is then blown off with $CO_2$, and the resin is reduced to a solids content of 75% with tert. butanol. Triethylamine, 1 part to 10 parts of resin, is added along with sufficient 80:20 water-tert. butanol to reduce the solids content to 35%.

The resin solution has the following characteristics:

Viscosity (Gardner-Holdt) _____ J
Color (Gardner) _____ 9–10

Conventional water-soluble dryers are added to give a metal content of 0.1% by weight, lead; 0.02%, by weight, cobalt; and 0.02%, by weight, manganese. Films are drawn on glass panels showing the following characteristics: they are set to touch by five hours; dry substantially tack-free in 8 hours, and dry and hard in 96 hours. After 96 hours the film has a Sward Hardness of 8. Films drawn on tin panels pass the ⅛" mandrel test.

*Example XIII*

This example illustrates the preparation of a baking resin using a saturated fatty acid and cross-linking agent, along with a polymethylolalkanoic acid, according to the present invention.

Three mols of phthalic anhydride, 2.2 mols of technical trimethylolethane, 2 mols of lauric acid and 1 mol of dimethylolpropionic acid are reacted according to the procedure of Example VII. The resulting resin is neutralized with dimethylethanolaminee, 9 parts per 100 parts of resin, and diluted with distilled water to reduce the solids content to 30%.

The resin solution has the following characteristics:

Viscosity (Gardner-Holdt) _____ Z
Color (Gardner) _____ 1
Appearance _____ Clear Two baking resin compositions are prepared: (A) 80%, by weight, of above resin (on solids basis) and 20%, by weight, of a water-soluble melamine-formaldehyde resin (Cymel 300), and (B) 80%, by weight, of above resin (on solids basis) and 20%, by weight, of a water-soluble ureaformaldehyde resin (Beetle 7291–20).

Each composition is applied as a coating (0.005" wet film thickness) to glass panels and baked 1½ hours at 150° C. The resulting coatings have the following characteristics:

| | Coating A | Coating B |
| --- | --- | --- |
| Sward Hardness (after 6–24 hours) | 16 | 26. |
| Gloss | Excellent | Excellent. |
| Adhesion (Cross-hatch) | do | Do. |
| Alkali Resistance after 16 hrs. in 5% NaOH Solution | No failure | No failure. |
| Water Resistance after 24 hours | do | Do. |

As many apparently widely different embodiments of this invention may be made without departing from the spirit and scope thereof, it is to be understood that the invention is not to be limited to the specific embodiments thereof except as defined in the appended claims.

We claim:

1. In the preparation of alkyd resins involving heating a reaction mixture comprising polyhydric alcohol and polycarboxylic acid, the improvement comprising the step of including in said reaction mixture at least one polymethylolalkanoic acid selected from the group consisting of trimethylolacetic acid and dimethylolalkanoic acids having from five to seven carbon atoms, the proportions of polyhydric alcohol, polycarboxylic acid and polymethylolalkanoic acid providing a resin having an acid number between about 35 and about 75, said polymethylolalkanoic acid providing at least half of such acid number.

2. The method of claim 1 wherein said polymethylolalkanoic acid comprises at least one of said dimethylolalkanoic acids.

3. The method of claim 2 wherein said dimethylolalkanoic acid comprises dimethylolpropionic acid.

4. The method of claim 1, wherein the resulting resin is substantially neutralized with a base the cation of which forms water-soluble salts with organic acids and diluted with water to provide an aqueous solution of said resin.

5. The method of claim 4 wherein the proportions of said reactants provide a resin having an acid number between about 45 and about 60.

6. In the preparation of alkyd resins involving heating a reaction mixture comprising polyhydric alcohol and dicarboxylic acid, the improvement comprising the steps of including in said reaction mixture dimethylolpropionic acid, the proportions of said polyhydric alcohol, dicarboxylic acid and dimethylolpropionic acid providing a resin having an acid number between about 45 and about 60 substantially all of which is provided by said dimethylolpropionic acid; and thereafter substantially neutralizing the resulting resin with a base the cation of which forms water-soluble salts with organic acids and diluting with water to provide an aqueous solution of said resin.

7. In the preparation of alkyd resins involving heating a reaction mixture comprising polyhydric alcohol having at least three hydroxyl groups and polycarboxylic acid, the improvement comprising the step of including in said reaction mixture: (a) an unsaturated fatty acid and (b) at least one polymethylolalkanoic acid selected from the group consisting of trimethylolacetic acid and dimethylolalkanoic acids having from five to seven carbon atoms; the amount of unsaturated fatty acid in mols, being substantially equivalent to the quantity $(x-2)$ times the number of mols of polyhydric alcohol, where $x$ is the number of hydroxyl groups in said polyhydric alcohol, and the proportions of polyhydric alcohol, polycarboxylic acid, unsaturated fatty acid and polymethylolalkanoic acid providing a resin having an acid number between about 35 and about 75, said polymethylolalkanoic acid providing at least half of such acid number.

8. The method of claim 7 wherein said polymethylolalkanoic acid comprises at least one of said dimethylolalkanoic acids.

9. The method of claim 8 wherein said dimethylolalkanoic acid comprises dimethylolpropionic acid.

10. The method of claim 7 wherein the resulting resin is substantially neutralized with a base the cation of which forms water-soluble salts with organic acids and diluted with water to provide an aqueous solution of said resin.

11. The method of claim 10 wherein the proportions of said reactants provide a resin having an acid number between about 45 and about 60.

12. In the preparation of alkyd resins involving heating a reaction mixture comprising polyhydric alcohol having at least three hydroxyl groups and dicarboxylic acid, the improvement comprising the steps of including in said reaction mixture: (a) an unsaturated fatty acid in an amount, in mols, substantially equivalent to the quantity $(x-2)$ times the number of mols of polyhydric alcohol, where $x$ is the number of hydroxyl groups in said polyhydric alcohol, and (b) dimethylolpropionic acid, the proportions of polyhydric alcohol, dicarboxylic acid, unsaturated fatty acid and dimethylolpropionic acid providing a resin having an acid number between about 45 and about 60, substantially all of which is provided by said dimethylolpropionic acid, and thereafter substantially neutralizing the resulting resin with a base the cation of which forms water-soluble salts with organic acids and diluting with water to provide an aqueous solution of said resin.

13. In the preparation of alkyd resins involving heating a reaction mixture comprising polyhydric alcohol having at least three hydroxyl groups and polycarboxylic acid, the improvement comprising the step of including in said reaction mixture: (a) a saturated fatty acid and (b) a polymethylolalkanoic acid selected from the group consisting of trimethylolacetic acid and dimethylolalkanoic acids having from five to seven carbon atoms.

14. The method of claim 13 wherein said saturated fatty acid is present in an amount, in mols, substantially equivalent to the quantity $(x-2)$ times the number of mols of polyhydric alcohol where $x$ is the number of hydroxyl groups in the polyhydric alcohol; wherein the polymethylolalkanoic acid comprises at least one of said dimethylolalkanoic acids; and wherein the proportions of polyhydric alcohol, polycarboxylic acid, saturated fatty acid and dimethylolalkanoic acid provide a resin having an acid number between about 35 and about 75, at least half of which is provided by said dimethylolalkanoic acid.

15. The method of claim 14 wherein the resulting resin is substantially neutralized with a base the cation of which forms water-soluble salts with organic acids and diluted with water to provide an aqueous solution of said resin.

16. The method of claim 15 wherein the proportions of said reactants provide a resin having an acid number between about 45 and about 60.

17. An alkyd resin comprising the resinous polymeric condensation product of a polyhydric alcohol, a polycarboxylic acid and at least one polymethylolalkanoic acid selected from the group consisting of trimethylolacetic acid and dimethylolalkanoic acids having from five to seven carbon atoms, said resin having an acid number between about 35 and about 75 at least half of which is provided by said polymethylolalkanoic acid.

18. An aqueous solution of the product of claim 17 substantially neutralized with a base the cation of which forms water-soluble salts with organic acids.

19. The product of claim 18 wherein the polymethylolalkanoic acid comprises at least one of said dimethylolalkanoic acids; and wherein said resin has an acid number between about 45 and about 60 substantially all of which is provided by said dimethylolalkanoic acid.

20. The product of claim 19 wherein the dimethylolalkanoic acid comprises dimethylolpropionic acid.

21. An alkyd resin comprising the resinous polymeric condensation product of polyhydric alcohol having at least three hydroxyl groups, polycarboxylic acid, an unsaturated fatty acid and at least one polymethylolalkanoic acid selected from the group consisting of trimethylolacetic acid and dimethylolalkanoic acids having from five to seven carbon atoms; the unsaturated fatty acid, in mols, being substantially equivalent to the quantity $(x-2)$ times the number of mols of polyhydric alcohol, where $x$ is the number of hydroxyl groups in the polyhydric alcohol; and the resin having an acid number between about 35 and about 75, at least half of which is provided by said polymethylolalkanoic acid.

22. An aqueous solution of the product of claim 21 substantially neutralized with a base the cation of which forms water-soluble salts with organic acids.

23. The product of claim 22 wherein the polymethylolalkanoic acid comprises at least one of the dimethylolalkanoic acids; and wherein the resin has an acid number between about 45 and about 60 substantially all of which is provided by said dimethylolalkanoic acid.

24. The product of claim 23 wherein the dimethylolalkanoic acid comprises dimethylolpropionic acid.

25. An alkyd resin comprising the resinous polymeric condensation product of polyhydric alcohol having at least three hydroxyl groups, polycarboxylic acid, a saturated fatty acid and at least one polymethylolalkanoic acid selected from the group consisting of trimethylolacetic acid and dimethylolalkanoic acids having from five to seven carbon atoms; the saturated fatty acid, in mols, being substantially equivalent to the quantity $(x-2)$ times the number of mols of polyhydric alcohol, where $x$ is the number of hydroxyl groups in the polyhydric alcohol; and the resin having an acid number between about 35 and about 75, at least half of which is provided by said polymethylolalkanoic acid.

26. An aqueous solution of the product of claim 25 substantially neutralized with a base the cation of which forms water-soluble salts with organic acids.

27. The product of claim 26 wherein the polymethylolalkanoic acid comprises at least one of said dimethylolalkanoic acid comprises at least one of said dimethylolalkanoic acids; and wherein the resin has an acid number between about 45 and about 60 substantially all of which is provided by said dimethylolalkanoic acid.

28. The product of claim 27 the dimethylolalkanoic acid comprises dimethylolpropionic acid.

References Cited

UNITED STATES PATENTS

| 2,941,968 | 6/1960 | McKenna | 260—22 |
| 2,973,331 | 2/1961 | Kraft | 260—22 |
| 3,066,108 | 11/1962 | Broadhead | 260—22 |

FOREIGN PATENTS 1,035,639   8/1958   Germany.

DONALD E. CZAJA, *Primary Examiner.*

R. W. GRIFFIN, *Assistant Examiner.*

UNITED STATES PATENT OFFICE
CERTIFICATE OF CORRECTION

Patent No. 3,345,313                                         October 3, 1967

Robert J. Ruhf et al.

It is hereby certified that error appears in the above numbered patent requiring correction and that the said Letters Patent should read as corrected below.

Column 4, line 15, for "above" read -- about --; line 32, for "hereafter" read -- hereinafter --; line 41, for "finsh" read -- finish --; column 12, line 38, for "dimethylethanolaminee' read -- dimethylethanolamine --; column 15, line 16, for "acid" read -- acids --; lines 16 and 17, strike out "comprises at least one of said dimethylolalkanoic acids".

Signed and sealed this 5th day of November 1968.

(SEAL)
Attest:

Edward M. Fletcher, Jr.                                    EDWARD J. BRENNER
Attesting Officer                                                     Commissioner of Patents